United States Patent [19]

Rice

[11] 3,938,230
[45] Feb. 17, 1976

[54] CUTTING TOOL
[75] Inventor: Gordon L. Rice, Farmington, Mich.
[73] Assignee: Posa-Cut Corporation, Farmington, Mich.
[22] Filed: Aug. 11, 1975
[21] Appl. No.: 603,674

[52] U.S. Cl................................. 29/96; 29/95 R
[51] Int. Cl.²........................................ B26D 1/00
[58] Field of Search........................... 29/96, 95 R

[56] References Cited
UNITED STATES PATENTS

| | | | |
|---|---|---|---|
| 3,045,322 | 7/1962 | Hertel | 29/96 |
| 3,142,110 | 7/1964 | Hertel | 29/96 |
| 3,436,799 | 4/1969 | Kopy | 29/96 |

*Primary Examiner*—Leonidas Vlachos
*Attorney, Agent, or Firm*—Cullen, Settle, Sloman & Cantor

[57] ABSTRACT

A rectangular shaped cutting tool having an upwardly, forwardly and sidewise opening V-shaped recess formed in one side face, with the edges of the V being uniformly sloped to form an acute angle with the inner wall of the recess, and a replaceable triangular shaped cutting insert formed of a hard, brittle metal, having its edges bevelled to correspond to the slope of said edges, vertically positioned in the recess and jammed downwardly and against the recess inner wall by both an upper releasable clamp and by cutting forces upon the exposed cutting corner of the insert. The uniform slope of the recess edges and its three openings permit the interchangeable use of inserts which are inaccurate or slightly variable in thickness and edge length. The improvement wherein the insert edges are bevelled from its opposite faces to define a cental raised ridge along its edges, rather than from one side, to allow the insert to be used in either left or right hand insert holders interchaneably.

1 Claim, 10 Drawing Figures

U.S. Patent Feb 17, 1976 3,938,230
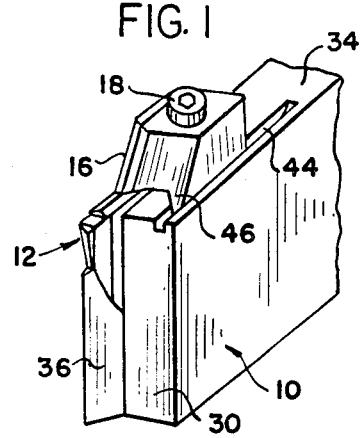
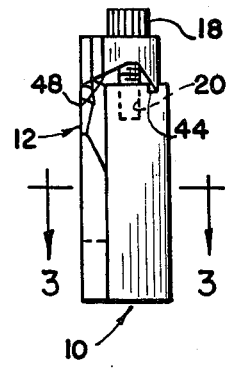
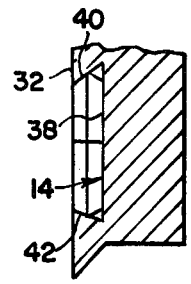
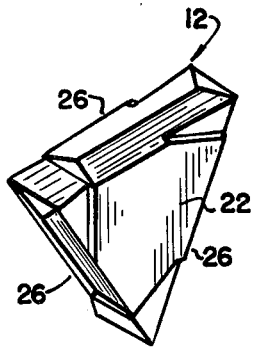
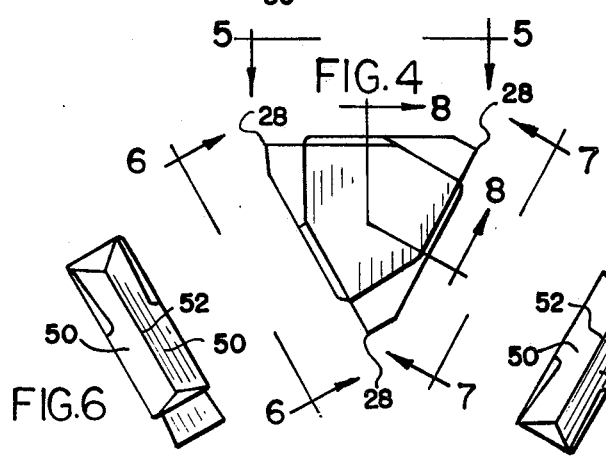

CUTTING TOOL

BACKGROUND OF THE INVENTION

Heretofore, tool holders of the present type have either been right hand or left hand with the requirement that the corresponding insert be of the same hand for use with the particular holder. This necessitated using separate left and right hand insert designs on certain applications where the inserts would be of identical cutting design except for the necessity of left and right hand design to properly fit the corresponding holder. In the earlier U.S. Pat. No. 3,436,799, there is shown a holder of left hand design and used therewith a corresponding insert of left hand design. That patent relates to a means for securing a throw-away type cutting insert within a tool holder.

In groove cutting tools, a cutting insert having a plurality of identical cutting edges is commonly employed. These throw-away cutting inserts are generally mounted in a tool holder assembly which provides the support and feeding and guiding means for the cutter itself. Under conditions of constant production use and resulting cutting edge wear, these cutting inserts must be frequently removed from the tool holder, to either bring a fresh cutting edge of the multi-edged insert into position or to replace the entire insert with a new one when all of the cutting edges have been used.

In the foregoing patent, there is shown a tool holder of a left hand design. Due to the flat taper of the insert edges, it was necessary to use a left hand design insert. For a tool holder of right hand design, it was necessary to use an insert of right hand design. This required making inserts of left and right hand designs to fit the corresponding right and left hand holders.

BRIEF DESCRIPTION OF THE INVENTION

It is an object of the present invention to provide in conjunction with such holders, whether right or left hand, a universal insert whose side edges are so constructed as to permit such insert to be either right hand or left hand and, thus, be useable within either a right hand holder or a left hand holder.

It is, therefore, an object of the invention to provide such universal type of right and left hand insert for holders of the type described as to greatly reduce costs in maintaining an adequate supply of inserts capable of use in either type of holder, whether right hand or left hand.

These and other objects will be seen from the following specification and claims in conjunction with the appended drawing:

THE DRAWING

FIG. 1 is a front perspective view of the front portion of the tool holder assembly.

FIG. 2 is a front elevational view of the tool holder of FIG. 1.

FIG. 3 is a fragmentary top sectional view taken in the direction of arrows 3—3 of FIG. 2.

FIG. 4 is a side elevational view of the present insert.

FIGS. 5, 6 and 7 are respectively side views taken in the direction of arrows 5—5, 6—6, 7—7 respectively of FIG. 4.

FIG. 8 is a section taken in the direction of arrows 8—8 of FIG. 4.

FIG. 9 is a perspective view of the insert.

FIG. 10 is a front perspective view of the opposite side of the tool holder of FIG. 1, with insert and clamp removed.

It will be understood that the above drawing illustrates merely a preferred embodiment of the invention, and that other embodiments are contemplated within the scope of the claims hereafter set forth.

THE PRIOR ART AS SET FORTH IN U.S. PAT. NO. 3,436,799

Referring now to FIGS. 1–3 and 9 of the drawing, the invention generally comprises a tool holder 10 having a removable cutting inset 12 secured within the insert-receiving recess 14. Insert 12 is secured in place by means of top clamp 16 and screw 18 which is received by threaded hole 20 in tool holder 10.

The triangular cutting insert is illustrated in greater detail in FIGS. 5–9. It comprises inner and outer faces 22,24, respective, and three identical sides 26. This configuration provides three cutting edges 28. The various other illustrated bevelled faces of the cutting insert do not form a part of this invention.

Referring now to the details of the tool holder, itself, tool holder 10 comprises a front face 30, left side face 32, and top face 34. Front face 30 has a forwardly projecting portion 36.

Insert-receiving recess 14 comprises a side wall 38 parallel to side face 32 and rear and front shoulders 40 and 42, respectively. Shoulders 40,42 are undercut at a slight angle, preferably about 11 degrees.

A slot 44 is formed in tool holder top face 34 to receive a leg 46 of top clamp 16. A clamping face 48 is provided on the underside of top clamp 16, and is inclined at an angle slightly greater than that of the side walls 26 of the cutting insert.

To change cutting edges, the insert is released by removing screw 18 and top clamp 16. This permits insert 12 to be lifted upwardly out of recess 14 and rotated 120° to bring a new cutting edge into position. The insert is then dropped back into place within the recess and the clamp 16 and 18 is reassembled to secure it in place.

The undercut shoulders 40 and 42 prevent lateral movement of the insert, and thereby permit the insert to be removed only when lifted upwardly out of the recess. Since the cutting force produced by the engagement of a workpiece by the cutting insert is directed downwardly, the forward projection 36 of tool holder 10 and the shape of recess 14 resist all deflection of the insert in this direction.

Since any lateral deflection of the cutting insert is prevented by side face 32 of the tool holder or the undercut shoulders 40 and 42, and since the downward resultant cutting force is completely resisted by forward projection 36 of the tool holder and the shape of recess 14, under normal conditions no further clamping means is necessary to retain insert 12 in the tool holder. However, since tool bit chattering is occasionally encountered under some circumstances, it becomes desirable to provide a means for resisting any upward force on the cutting insert. It is for this purpose that top clamp 16 is provided. The underface 48 of clamp 16 is preferablly inclined at slightly more than eleven degrees, so that it not only exerts a downward force on the cutting insert, but will also provide additional resistance to any lateral force toward the left as viewed in FIGG 2, as do the undercut shoulders 40 and 42.

Thus, the tool holder provides a simple yet positive means for retaining in place a throw-away type cutting insert. The shape of the insert-receiving recess itself provides all of the clamping force necessary to resist normally encountered cutting forces.

DETAILED DESCRIPTION OF THE INVENTION

The primary difference of the present invention as distinguished from the disclosure in U.S. Pat. No. 3,436,799, is the form of the cutting edges of the insert. Whereas, in the earlier Patent, and as defined, the three edges of the insert were substantially flat and bevelled towards one face of the insert only. This required that the insert must be of the same hand, such as left hand, as shown in the Patent, corresponding to the left hand holder of that Patent.

In order to provide a universal insert which may be adapted for either right or left hand holders, the present improvement contemplates the formation of the side edges of the insert, such as shown in FIGS. 5 through 9. Here, instead of a flat surface or edge for the insert along three sides, there are provided for each side along its length the opposed pair of tapered sides which are bevelled outwardly from opposite faces of the insert as at 50 and terminate in the elevated elongated ridge 52 which extends substantially throughout the length of each of the respective side edges.

By this construction, and as illustrated in FIGS. 1 and 3, wherein the holder is a left hand holder, the present insert may be positioned within the holder recess 14 from either side since it is a universal insert and is adapted for either right or left hand holders.

As shown in FIG. 3, a substantial and material portion of the insert throughout the width of its corresponding side edge 50 registers with a corresponding substantial portion of the inner walls 40 and 42 which define the undercut recess 14.

In the present construction, the undercut holding portion 48 of the clamp 16 overlies said outer bevelled portion 50 so as to retainingly engage the same as particularly shown in FIGS. 1 and 2.

The present invention is an important improvement for the reasons above set forth in providing a universal insert. In the illustrative embodiment, the angle of the taper of the opposed converging edges 50, FIG. 5, is approximately eleven degrees, for illustration. This eleven-degree locking angle is ground from both sides of the insert instead of from only one side as in the prior art. The primary purpose of this feature is to allow the insert to be used on either left or right hand insert holders interchangably. This negates the necessity of using separate left and right hand insert designs where the inserts are otherwise of identical cutting design except for size.

Thus, the necessity of selecting a right or left hand design insert is obviated at a great reduction in expense. Accordingly, the present insert is universal in a sense that it is neither right nor left hand, but both in design and, accordingly, may be adapted for either a right or left hand holder.

Having described my invention, reference should now be had to the following claim.

I claim:
1. In a cutting tool having a horizontally elongated, rectangular in cross-section tool holder having a front face, a vertical side face, and an upper face;
an upwardly opening V-shaped recess cut into said side face and forming a flat, vertical recess wall parallel to, but spaced inwardly of the plane of said side face, with one leg of the V extending upwardly and forwardly of the tool holder and terminating at said front face considerably below said upper face so that the recess is open forwardly as well as upwardly and sidewise, and with the other leg of the V extending upwardly and rearwardly of the tool holder and terminating at said upper face;
the edges defining said legs each being flat and uniformly sloped inwardly to form in cross-section a continuous, uniform acute angle inside the recess between the flat recess wall and said edges so that the recess gradually widens from the tool holder vertical side face towards the recess wall;
a replaceable cutting tool insert formed of a flat, substantially equilateral triangular shaped plate of hard, brittle metal, each of whose corners forms a cutting tip;
the improvement wherein the three edges of the insert are tapered and bevelled outwardly at an acute angle from its opposite faces and terminate in a central elongated ridge along each side, said angle corresponding to the shape of the edges defining said legs; whereby said insert is adapted for selective use in right and left hand tool holders;
said edges defining said recess legs being approximately as wide as the thickness of the insert and the two legs intersecting an at angle substantially equal to the angles of intersections between the edges of the cutting tool insert;
said insert being vertically arranged within the recess with said one of its faces in full face to face contact with said recess wall and with the one tapered sides of two of its edges in full face to face contact with the full length of the two edges defining said legs for a portion of the depth of said recess and with one corner thereof being exposed and extending forwardly of the tool holder front face;
a downwardly opening releasable clamp member secured to said upper face and having a narrow clamping edge forming a narrow line contact with the outer tapered upper one edge of the insert, wherein said insert is jammed downwardly and towards and against the recess wall by the clamp and the cooperating sloped and bevelled edges and cutting forces applied to said exposed corner;
and whereby said insert may be released and rotated to successively expose each corner as the corners wear out and may be replaced with a new insert of approximately the same thickness and edge lengths, so that inaccuracies and slight variations of size of the inserts are accommodated by the inserts extending a variable distance outwardly or inwardly of the side, upper and forward openings of the recess.

* * * * *